United States Patent [19]

Cogswell et al.

[11] Patent Number: 4,624,886

[45] Date of Patent: Nov. 25, 1986

[54] REINFORCED FIBRE PRODUCTS

[75] Inventors: Frederic N. Cogswell, Guisborough; Umakant Measuria, Great Ayton, both of England

[73] Assignee: Imperial Chemical Industries PLC, London, England

[21] Appl. No.: 691,642

[22] Filed: Jan. 15, 1985

[30] Foreign Application Priority Data

Jan. 27, 1984 [GB] United Kingdom ............... 8402193

[51] Int. Cl.$^4$ .................................................. B32B 7/00
[52] U.S. Cl. ...................... 428/245; 428/260; 428/273; 428/408; 428/902; 428/272
[58] Field of Search .............. 428/251, 260, 265, 267, 428/273, 408, 902, 245, 272

[56] References Cited

U.S. PATENT DOCUMENTS

| 4,135,028 | 1/1979 | Hiestand et al. | 428/272 |
| 4,410,586 | 10/1983 | Ladizesky et al. | 428/245 |
| 4,496,621 | 1/1985 | Habert et al. | 428/245 |
| 4,569,884 | 2/1986 | Weinand et al. | 428/245 |

Primary Examiner—James J. Bell
Attorney, Agent, or Firm—Cushman, Darby & Cushman

[57] ABSTRACT

A process for impregnating a fibrous product, said fibrous product being a fabric woven from reinforcing fibres or a fabric of randomly disposed fibres, with a matrix polymer comprising causing partial impregnation of the fibrous structure by introducing the fibrous structure into a molten composition comprising the matrix polymer and a melt plasticizer for the matrix polymer and subsequently causing substantially complete wetting of the filaments of the fibrous structure by volatilizing the melt plasticizer from the partially impregnated structure at a temperature at which the polymer is molten, the melt plasticizer being thermally stable at the temperature of the melt and having volatility characteristics such that the plasticizer can be removed below the decomposition temperature of the melt but sufficiently involatile at the temperature of the melt to permit the viscosity of the melt to be reduced by comparison with the melt viscosity of the polymer at the same temperature. When a woven fabric is employed thermoformable composites can be obtained having short beam shear strength values at least 0.7 times the tensile strength of the plastics matrix material of the composite.

4 Claims, No Drawings

REINFORCED FIBRE PRODUCTS

This invention relates to a process of impregnating fibrous structures, such as woven fabrics of reinforcing fibres, with a matrix polymer.

European Patent Publication No. 102 159 describes processes of impregnating fibrous products containing a plurality of continuous reinforcing filaments with a molten polymer composition comprising a mixture of a thermoplastic polymer and a melt plasticiser for the polymer, the melt plasticiser being thermally stable at the temperature of the melt and having volatility characteristics such that the plasticiser can be volatilised from the composition below the decomposition temperature of the polymer but has a sufficiently low volatility at the temperature of the melt of plasticise the polymer. The specification implies that the fibrous product to be impregnated must have sufficient strength to be drawn through the molten composition under tension without the frequency of breakage which would render the process in impracticable commercial process and that suitable fibrous products for use in the process contain a majority of continuous fibres aligned in one direction of the product so that it can be pulled through the melt in this direction. Considerable difficulties are experienced in obtaining satisfactorily impregnated products when the fibrous structure consists of a fabric woven from reinforcing filaments because, even though the fabric is sufficiently strong to be tensioned and pulled through the impregnation system, the tensioning causes considerable distortion and contraction of the fabric in the direction transverse to the tensioning direction. It would also be expected that the degree of impregnation of the transverse tows of the fabric would be poor because they are not under tension. Furthermore, fibrous products which have less than 50% by weight of fibres, as continuous fibres aligned in a given direction suffer from the problem that tensioning of the product is likely to result in interruption of the impregnation process through breaking of the fibrous product.

Processes have now been developed which enable the processes described in European Patent Publication No. 102 159 to be adapted to permit both woven fabrics and low strength fibrous structures to be impregnated surprisingly effectively so that highly desirable products result. In this specification these fibrous products are referred to as woven fabrics and fabrics of randomly disposed fibres respectively.

According to the invention there is provided a process for impregnating a fibrous product, said fibrous product being a fabric woven from reinforcing fibres or a fabric of randomly disposed fibres, with a matrix polymer comprising causing partial impregnation of the fibrous structure by introducing the fibrous structure into a molten composition comprising the matrix polymer and a melt plasticiser for the matrix polymer and subsequently causing substantially complete wetting of the filaments of the fibrous structure by volatilising the melt plasticiser from the partially impregnated structure at a temperature at which the polymer is molten and, optionally, mechanically manipulating the partially impregnated structure, whilst the impregnating composition is still molten, to cause flow of melt relative to the filaments, the melt plasticiser being thermally stable at the temperature of the melt and having volatility characteristics such that the plasticiser can be removed below the decomposition temperature of the melt but sufficiently involatile at the temperature of the melt to permit the viscosity of the melt to be reduced by comparison with the melt viscosity of the polymer at the same temperature.

Preferably the weight ratio of polymer to melt plasticiser in the molten composition is in the range 1:4 parts to 4:1, more preferably between 1:2 and 2:1.

Although mechanical manipulation of the partially impregnated structure can be used to complete the impregnation so that the individual filaments are substantially completely wetted it has been found that the act of volatilising the plasticiser has a very significant effect on the impregnation process, bringing about good impregnation with the use of little or no mechanical manipulation. The advantage of minimising the mechanical work input to the structure is that there is less risk of abrading or breaking filaments in the fabric. In the case of woven fabric there is also less risk of the organisation of the interwoven tows being disturbed, although some disorganisation of tows lateral to the direction of draw will occur, if the structure is tensioned in the direction of draw, unless the tows are restrained in the lateral direction.

The processes used in the present invention are adapted from processes described in European Patent Publication No. 102 159. The latter describes a process in which the continuous fibrous product is introduced to the molten composition by pulling the fibrous product under tension over bars or rollers which are situated within a bath of the molten composition. The action of biassing the tensioned continuous fibre against the bars or rollers results in fibrous product which is substantially completely impregnated.

In another process described in European Patent Publication No. 102 159 the amount of polymer held in a molten state at any given time is minimised by using a process in which the tensioned continuous roving or tow is formed into a band comprising substantially contiguous filaments which are pulled over a spreader surface, preferably a heated spreader surface, to form a nip between the band and the spreader surface and a molten mixture of polymer and plasticiser is provided at the nip. In an alternative process at least part of the heat required to provide a molten mixture is provided by heating the fibre directly. Impregnation of the band formed by the contiguous filaments is effected by tensioning the continuous band so that positive pressure is applied on the polymer melt by the band as it is pulled over the spreader surface.

It has now been found that woven fabrics may be impregnated with surprising effectiveness by these processes, despite the fact that about half the filaments will travel parallel to the spreader surfaces in an untensioned manner. It appears that the volatilisation step makes such a contribution to the impregnation processes that tensioning of the woven fabric may be reduced to an appreciably lower level reducing risk of distortion of the fabric (that is the organisation of the warp and weft fibres) and damage to the filaments.

Thus, compared with the processes exemplified in European Patent Publication No. 102 159 the degree of tensioning applied to the fibrous structure as it passes through the impregnation stage of the process is considerably less.

The products resulting from the process in which at least 30% by volume of woven fabric is used have a surprisingly high level of physical properties when compared with known products. The physical properties are assessed in the context of the matrix dominated properties and the fibre dominated properties. The most useful matrix dominated property is that known as the Short Beam Shear Strength (ASTM Standard D-2344 "Apparent Interlaminar Shear Strength of Parallel Fibre Composites by Short-Beam Shear Method). In the present examples a span:thickness ratio of 5:1 is employed. Using the process of the present invention composite products are readily obtained having values for Short-Beam Shear Strength (SBS) which are at least 0.7 times, and frequently at least 0.8 times the value for the tensile strength of yield strength of the matrix polymer itself. This indicates a high utilisation of the matrix properties.

The fibre dominated properties which are used to characterise the composite products are flexural modulus and flexural strength. These are assessed as a proportion of the theoretical reinforcement values. The theoretical reinforcement values are defined as follows: Theoretical Flexural Modulus=$N \times Vf \times$ Modulus of fibre Theoretical Flexural Strength=$N \times Vf \times$ Strength of fibre, where Vf is the volume fraction of fibre and the factor N represents the fraction of the reinforcement arrayed in the test direction. For biaxial products such as composite based on woven fabrics, $N=0.5$. The above theoretical values are approximations when the composite contains at least 30% by volume of fibres, ignoring the contribution of the matrix polymer to modulus and strength, because most fibres, particularly carbon fibres, have a modulus and strength at least 10 times that of the matrix polymer. The composite products of the invention preferably have flexural modulus and strength values which are at least 0.8 times, and often at least 0.9 times, these theoretical reinforcement values. These values indicate exceptionally high utilisation of the inherent fibre properties.

In a further method of characterisation comparison is made between the composite woven products of the invention and products of the same composition formed by biaxial lamination of impregnated continuous collimated fibre prepregs. This method is useful where there is no suitable theoretical comparison, that is for critical service properties such as compression strength and impact performance. Woven products according to the invention can realise values of 0.8 times the values obtained with such products, despite the fact that in woven products, the cross over points in the fabric constitute areas which are difficult to impregnate.

The high degree of physical properties achieved is surprisingly in view of the previously held belief that impregnation was effected by the mechanical work input arising from tensioning of the fibrous structure.

At the present time the mechanism for this surprising ability to impregnate such woven fabrices without significant mechanical work input is not understood. It is, however, possible to speculate about two possible mechanisms. Firstly it can be argued that the act of the plasticiser boiling may cause intense local pressure gradients which facilitate impregnation. Alternatively, or additionally, it is postulated that at the time of the plasticiser boiling, the mixture of polymer plus plasticiser passes through a state of an intimate dilute mixture of a polymer and a gaseous plasticiser before the plasticiser is completely volatilised leaving an unplasticised melt. Such a transient state would have a very high mobility allowing easy impregnation of the fabric and could account for the surprising results achieved. These possible explanations are only offered as post-rationalisation of the invention, and the invention is not intended to be limited by these theories.

The woven product produced by the present invention is a superior product to impregnated woven products produced by conventional compression impregnation, such as by the film stacking technique. In those processes the compression process results in the filaments of the tows of the fabric being compacted together so that when the impregnation process is completed after the lengthy compression process the filaments are present as bundles surrounded by matrix rich areas. The woven product of the present invention comprises a reinforced, thermoplastic composite structure in which the reinforcement consists of at least 30% by volume of interwoven tows of continuous filaments, the continuous filaments in the tows being substantially uniformly dispersed in a thermoplastic polymer matrix. A further advantage of the invention of the compression impregnated product is that it can be produced in continuous lengths, that is lengths of at least 2 meters, preferably at least 10 meters. The only practical limit to the length of the product is the length of the fabric employed.

In the case of fibrous products containing less than 50% by weight of fibres disposed in a given direction in the product the freedom or ability to tension the fibrous product against a spreader surface without frequent breakage is considerably less than when at least 50% of fibres are disposed in a given direction. According to the present invention such fibrous products are introduced into a molten polymer composition containing a melt plasticiser which can eventually be devolatilised below the decomposition temperature of the polymer under a tension insufficient to break the fibrous product into discontinuous lengths and the partially impregnated structure is subsequently subjected to a sufficient temperature for a sufficient time to volatilise substantially all the melt plasticiser whereby the individual filaments of the fibrous product are substantially completely wetted.

Where the fibrous product has very low resistance to tension, such as a glass fibre mat containing randomly disposed continuous fibres the fibrous product may be introduced into the molten polymer composition on a supporting web rather than applying tension to pull the fibrous structure through the impregnation system.

When a process is used in which the fibrous structure is in the form of a band which forms a nip with a spreader surface the mixture of polymer and plasticiser supplied to the nip may take a variety of forms. It may, for example, comprise a dry blend of polymer powder and plasticiser or a melt of the mixture prepared externally, for example in a screw extruder and metered as a melt to the nip. Yet again, the band of filaments may have been provided on one or both sides with a coating of the polymer/plasticiser mixture which is caused to impregnate the band and wet the filaments after the polymer mixture has been melted. The coating may be in the form of a preformed film or tape of the polymer containing plasticiser or may be separate films of polymer and plasticiser which are fed in loose contact with the band of filaments and are impregnated into the band, sufficient heat being supplied to melt the preformed films.

After the plurality of continuous fibres have been at least partially impregnated means may be provided for increasing the temperature of the melt mixture present in association with the continuous fibres so that the plasticiser can be volatilised from the fibre-reinforced structure. This is most easily achieved by passing the partially impregnated structure under and over a series of heated bars or rollers at a temperature above the melting point of the polymer. In a preferred process heated rollers are used which are rotated so that the circumferential velocity of the rollers matches the line speed of the impregnated fibrous structure. Means may also be provided for final consolidation of the fibre-reinforced structure whilst it is still at an elevated temperature. In practice it has surprisingly been found that with suitable plasticisers it is not necessary to make any special provision for increasing the temperature after the impregnation stage to remove the plasticiser providing the impregnated structure is held above the melting temperature of the polymer for a sufficient period.

Whether or not it is necessary to provide additional heating means to remove residual plasticiser it is advisable to provide means for containing and recovering the volatilised plasticiser. The plasticisers used in the invention will normally be high boiling point materials, particularly when they are used in conjunction with high melting point aromatic polymers. Such materials are normally solid at ambient temperature and therefore condense readily on cooled surfaces and may be recovered by being scraped off. This provides a much more convenient process than is involved in the recovery of materials which are liquids at ambient temperature.

When the fibrous product being impregnated contains a substantial proportion of fibres lying transverse to the direction in which the product is being drawn through the molten polymer it may be useful to be able to restrain these lateral fibres during the impregnation process by gripping the edges of the fibrous product in a stenter device so that the fully impregnated product is obtained after cooling in a form in which essentially all the fibres have been maintained as straight and aligned fibres, the directions of alignment being the direction of draw and the direction transverse to the direction of draw.

In an alternative process the transverse fibres are unrestrained during impregnation but are stretched to their natural length whilst the polymer of the impregnated composite is in a heat softened condition. However, the use of a low tension in the woven product substantially avoids the need to use such restraining processes.

The impregnated product of the process of the invention may be subjected to further treatments depending on the intended shape and purpose of the end product.

The impregnated products of the processes hereinbefore described may be wound on rolls for subsequent use in fabrication processes requiring a continuous product or may be chopped into lengths for subsequent fabrication.

The impregnated woven products of the invention are particularly useful for use in further fabrication procedure because the products have a number of advantages. Thus, such products have enhanced product toughness in respect to delamination processes. They provide thin, single-ply laminates with balanced properties. In comparison with products made by laminating uniaxial prepreg to give a balanced product four plies of uniaxial material are required to give the same balance of properties as a single-ply laminate according to the present invention. Enhanced thickness uniformity is attainable because the nature of the weave constrants movement of the fibres in consolidation or pressing operations. The product is more amenable to handling without splitting than thin uniaxial prepreg which is weak in the transverse direction. The nature of the wave in the filaments along their length resulting from the weave gives a product which is more resistant to fibre buckling when the product is subjected to compressive stresses. Finally, the woven products of the invention are more easily thermoformed into shaped structures than those derived from lay up of uniaxially impregnated materials.

The upper limit of fibre content in the products obtained by use of the invention is determined by the amount of polymer required to wet out the individual filaments of the fibrous product. In general it is difficult to achieve good wetting with less than 20% by volume of polymer although excellent results are obtainable by using the process of the invention to incorporate 35% by volume of polymer in the fibre-reinforced composition.

The reinforcing fibre may be glass, carbon or a high modulus synthetic polymer fibre, such as Kevlar (registered trade mark of Du Pont). When the fibrous structure is a woven fabric it may take the form of any of the fabrics known in the industry, including braided fabrics and tied uniaxial fabrics, where bundles of collimated fibres are linked by occasional weft ties. The preferred fabrics are biaxially woven cloths in which the weave may be any of the known types including satin weave, where the warp and weft tows completely overlap leaving no gaps between the tows.

The polymer matrix used in the invention is preferably a tough thermoplastic polymer having a tensile yield strength in excess of 70 MN/m$^2$ but may be thermosetting in nature providing that it can form a melt. The preferred polymers are those which are repeatedly thermoformable but which do not show any significant chemical change as a result of the repeated thermoforming operations. The molecular weight of the polymer used at the impregnation stage may be lower than that considered necessary to impart acceptable physical properties to the polymer itself. The invention includes the use of known techniques for increasing the molecular weight of the polymer after impregnation. Thus before impregnation the polymer used is not necessarily a tough polymer having a tensile yield stress of at least 70 MN/m$^2$.

The thermoplastic polymers used in the process of the invention are preferably those containing aromatic repeat units in the chain, such as polysulphones, polyethersulphones, polyetherketones, polyetheretherketones, polyarylene oxides, polyarylene sulphides, aromatic polyamides, aromatic polyesters, aromatic polycarbonates and polyetherimides. In general, the thermoplastic aromatic polymers used in the compositions of this invention comprise repeat units of the general formula $$-Ar-X-$$

where Ar is selected from mono or polycyclic aromatic radicals and X is selected from at least one of O, S, SO$_2$, O.CO, O.CO.O, CO, —NHCO— and

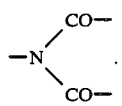

Ar and/or X may vary from unit to unit in the polymer chain.

Particularly useful are the class of polyetherketones which contain the recurring unit (I):

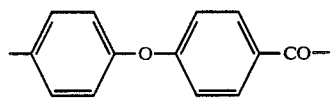

Such polymers are disclosed, inter alia, in British patent specification No. 1 414 421 which describes such polymers containing the unit (I) as the sole repeating unit or in conjunction with the repeating unit (II):

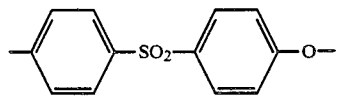

A preferred polyetheretherketone having the repeating unit (III):

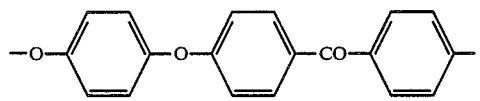

either alone or in conjunction with other repeating units is disclosed in European patent publication No. 1879.

Examples of polyethersulphones and proceses for their production are described in British patent specifications Nos. 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 296 383, 1 298 821 and 1 303 252, Canadian patent specification No. 847 963, German OLS specification No. 1 938 806 and 2 433 400 and Swiss patent specification No. 491 981.

Although useful reinforced products can be produced from thermoplastics having a melt viscosity at zero shear rate at the temperature of the impregnation process within the range 1–30 $Ns/m^2$ it is preferred that the viscosity of the polymer used should be greater than 30 $Ns/m^2$, desirably greater than 50 $Ns/m^2$ and even more desirably at least 100 $Ns/m^2$.

The plasticisers which are suitable for use in the invention are materials which are thermally stable at the elevated temperatures which are characteristic of the melting points of the thermoplastic polymers used in the invention, which can be volatilised from the composition at temperatures below the decomposition temperature of the thermoplastic polymer but which are sufficiently involatile at the temperature employed in the impregnation process to provide a plasticised polymer melt of lower melt viscosity than the polymer itself. In the case of aromatic polymers suitable plasticisers having these characteristics are found in the classes aromatic ketones, aromatic sulphones and aromatic esters. Typical high boiling materials are diphenyl sulphone ditolyl sulphone, benzophenone, phenyl benzoate and benzyl benzoate.

The mixure of plasticiser and polymer may be provided by any conventional technique for providing mixture. For example, mixture may be a dry blend of polymer and plasticiser, a mixture which has been intimately mixed by compounding in a screw extruder, a mixture prepared by coating granules of the polymer with a solution of a plasticiser and volatilising the solvent from the coated granules or in some cases a suitable plasticiser may be used in the course of producing the aromatic polymer. Whereas in the normal course of isolating such polymer the plasticiser would need to be removed the plasticised product constitutes an ideal and cheaper raw material for the present invention than the isolated polymer.

The compositions of the invention may include particulate fillers to enhance the properties of the composition. The term 'particulate filler' includes particles which are plate-like or needle-like in structure. The concentration of filler, if present, should be in the range 1 to 30% by volume, preferably 5 to 15% by volume. Suitable fillers are talcs, mica, graphite, wollastinite and metal powders.

Although the major use of the impregnated products obtained from the processes hereinbefore described is in applications requiring the use of long lengths of the products, that is greater than 100 mm long, the products find particular utility when chopped into pellets or granules in which the reinforcing fibres have a length of at least 3 mm and preferably at least 10 mm. These products may be used in the conventional fabrication process such as injection moulding and show advantages over prior art products in pellet form because the fibre length in the pellet is retained to a much greater extent in articles fabricated from the pellets of the invention than when using the prior art products. This greater retention of fibre length is believed to be a result of the greater protection afforded to the individual reinforcing filaments in the product of the invention by virtue of the good wetting by polymer which arises from use of the processes hereinbefore described.

This aspect of the invention is particularly important because it enables reinforced articles to be formed in versatile operations, such as injection moulding, which employ screw extrusion processes to melt and homogenise the feed material, with a surprisingly high retention of fibre length and consequent enhancement of physical properties. Thus the product of the invention enables moulded articles to be obtained from fabrication processes which employ screw extrusion which articles contain at least 50% and preferably at least 70% by weight of the fibres in the article of a length of at least 3 mm long. This is considerably longer than currently obtainable from the commercially available reinforced products.

The products suitable for injection moulding may be used directly or may be blended with pellets of other thermoplastics products. These other products may be of the same polymer but having different molecular weight or may be of a different polymer providing that the presence of the different polymer does not adversely affect the overall balance of properties of the composition. The other products may be an unfilled polymer or may contain a particulate or fibrous filler. Blends with materials containing the conventionally produced reinforced moulding powders, that is moulding powders with reinforcing fibres up to about 0.25 mm long are particularly suitable because the overall reinforcing fibre content of the blend can be kept high to produce maximum strength even though the shorter reinforcing fibres do not contribute so effectively as the long fibres present from the product of the present invention.

The invention is further illustrated by reference to the following examples.

EXAMPLE 1

This example demonstrates the significant contribution to fibre impregnation brought about by the removal of plasticiser by volatilisation.

A 15 cm length of woven carbon fibre (supplied as Carr Satin by Carr Fibres comprising woven tows of Toho Besfight tow containing about 3000 filaments per tow) was washed with methyl ethyl ketone to remove the size on the filaments. The dried fabric was dipped in a bath of molten polymer consisting of a mixture in the weight ratio of polyetheretherketone (PEEK)/diphenyl sulphone (DPS) of 1:4 and held at 300° C. The polyetheretherketone had a melt viscosity measured at 400° C. of 25 $Ns/m^2$ at a shear rate of 1000 $sec^{-1}$. The fabric was removed from the bath after 10 seconds and allowed to solidify. This material was only poorly wetted as indicated by breaking the sheet which break exposed a large number of unwetted fibres. The product was then heated to 400° C. to remove substantially all the plasticiser. The resulting product showed good wetting as indicated by breaking the sheet. This occurred with a clean "snap" and no loose or unwetted fibres were observed. The experiment was repeated with and as received woven fabric. Both products contained approximately 60% by volume of fibre.

The products were pressed into a 2 mm thick plaque (8 layers of fabric) for measurement of flexural modulus at 23° C. Values of 72 $GN/m^2$ were obtained for both the sized and unsized fibres.

A comparison sample of balanced biaxial, 0°/90° sheet prepared by laying up two prepreg sheets of uniaxial carbon fibre impregnated with the same polyetheretherketone (according to European Patent Publication No. 102 159) had a similar flexural modulus (60 $GN/m^2$ at 52% by volume fibre, projected to 69 $GN/m^2$ at 60% by volume of fibre).

EXAMPLE 2

A shuttle woven carbon fibre fabric (supplied as Carr Satin by Carr Fibres) about 4 cm wide was impregnated with the compositions listed in Table 1 below using a technique in which the fabric was drawn from a reel over a series of 4 fixed, heated cylindrical bars of 12.5 cm diameter maintained at 400° C. The fabric was subjected to the minimum pretensioning necessary to draw it from the reel and over the bars. The impregnant compositions listed were fed as powders, or a dry powder blend of polymer and plasticiser, to the nip formed between the woven fabric and the first heated bar. The fabric was drawn through at 30 cm/min. The impregnants melted rapidly in the nip and became distributed in the woven fabric. Provision was made for extracting fumes of diphenyl sulphone. By the time the fabric had passed over the fourth bar the product was essentially free (<1% by weight) of diphenylsulphone.

The flexural properties were measured at 23° C. on samples approximately 2 mm thick, pressed from 8 layers of impregnated fabric at a temperature of 400° C. and a pressure of 10 atmosphere.

The results obtained are recorded in Table 1.

TABLE 1

| Impregnant | Fibre Content (% by vol) | Flexural Modulus ($GN/m^2$) | Flexural Strength ($MN/m^2$) |
| --- | --- | --- | --- |
| PEEK of melt viscosity 25 $Nsm^2$ measured at 400° C. shear rate of 1000 $sec^{-1}$ | 47 | 59 | 450 |
| Polymer as above + equal parts by weight of diphenylsulphone | 50 | 61 | 411 |
| PEEK of melt viscosity 100 $Ns/m^2$ measured as above + equal parts by weight of diphenylsulphone | 50 | 69 | 740 |
| Control (0°/90 biaxial layup as in Example 1 | 52 | 60 | 850 |

Microscopic examination of the product impregnated with PEEK of melt viscosity 100 $Ns/m^2$ indicated excellent wetting of the fibres by polymer.

EXAMPLE 3

The procedure of Example 2 was repeated using a shuttle woven fabric about 13 cm wide and the polyetheretherketone having a melt viscosity of 100 $Ns/m^2$. The equipment used in this example also included a series of five stationary rollers between the fabric reel and the first impregnation bar to impart tension to the fabric (in the belief that this was essential to obtain complete impregnation). The impregnated product was found to have contracted about 15% in the lateral direction because the fibres had not been restrained in the lateral direction. Test samples were prepared by pressing 8 layers of single ply sheets at 10 atmospheres pressures and a temperature of 400° C.

The procedure was repeated using a ratio of polymer/plasticiser of 1:2.

The results obtained are given in the Table 2 below, in comparison with two samples of differing fibre content prepared by lay-up of impregnated uniaxial product as described in Example 1.

TABLE 2

| | | Flexural Properties at 23° C. | | |
| --- | --- | --- | --- | --- |
| Impregnant | Fibre Content (% by vol) | Modulus ($GN/m^2$) | Strength ($MN/m^2$) | Short Beam Shear Strength ($MN/m^2$) |
| PEEK/DPS in weight ratio 1:1 | 50 | (a) 62 (8) (b) 48 (5) | 980 (100) 750 (100) | 84 (2) — |
| PEEK/DPS in weight ratio 1:2 | 55 | (a) 72 (3) (b) 45 (0) | 990 (60) 630 (50) | 79 (8) — |
| Balanced uniaxial controls | | | | |
| (1) | 52 | 60 | 850 | 80 |
| (2) | 60 | 69 | 980 | 84 |

(a) Properties measured in warp direction of cloth.
(b) Properties measured in weft direction of cloth.
The values in brackets are standard deviations.

This comparison shows that the woven product compares favourably with uniaxial layup material despite the fact that the fibres in the direction transverse to draw are present as waved fibres due to the 15% lateral contraction occurring in the impregnation process. Improved results would be expected by lateral stretching of the impregnated product whilst it is in a heat softened condition and subsequent cooling whilst stretched to provide a product in which the fibres are stretched to their maximum lengths (allowing for deviations due to the weave).

Further pressed samples were prepared for impact testing by the Instrumented Falling Weight Impact Test (IFWIT) described by C J Hooley and S Turner (Mechanical Testing of Plastics Institute of Mechanical Engineers June/July 1979 Automotive Engineer, using a dart of 12.7 mm in diameter and using a 40 mm diameter support ring, results being normalised to 1 mm thickness.

The results on the unstretched material are given in Table 3.

TABLE 3

| Sample | | Fibre Content (% by vol) | Initiation (J) | Failure (J) |
|---|---|---|---|---|
| Balanced Uniaxial controls as in Table 2 | (1) | 52 | 2.2 (0.5) | 6.9 (1.4) |
| | (2) | 60 | 1.6 (0.3) | 8.1 (1.8) |
| Derived from PEEK:DPS 1:1 as in Table 2 | | 50 | 1.7 (0.2) | 6.1 (1.4) |
| Derived from PEEK:DPS 1:2 as in Table 2 | | 55 | 2.0 (0.4) | 5.8 (0.6) |
| Laterally stretched* sample | | 55 | 1.9 (0.5) | 7.8 (0.6) |

*Sample prepared from PEEK:DPS 1:2 product by stretching to remove the 15% retraction in lateral fibres.

COMPARATIVE EXAMPLE A

For comparison purposes a number of samples in which impregnation was accomplished by compression techniques were evaluated.

Sample A was prepared by Rotorway Composites using moulding technology as recommended by L N Phillips in "Fabrication of Reinforced Thermoplastics" by means of the film stacking technique, HMSO London 1980. Twenty layers of plain weave carbon fibre fabric (supplied under the code FH A004 by Fothergill and Harvey PLC) was interleaved with film made from 'Victrex' 459 polyetheretherketone (supplied by ICI PLC). The assembly was pressed at 360° C. for 1 hour at a pressure of 150 atmospheres. Sample B was prepared in the same way except in that the fabric was pretreated with a size of polyethersulphone polymer, deposited from solution and dried. The unsized fabric gave a void content of 4.0% and the sized fabric a void content of 2.6%.

The results under Sample C merely record the results given by J T Hartness at the 14th National SAMPE Technical Conference, reported on page 26, 14, 1982.

Sample D was prepared from the woven carbon fibre fabric used in Sample A. Polyetheretherketone powder (having a melt viscosity of 25 Ns/m$^2$, measured at a shear rate of 1000 sec$^{-1}$ at 400° C.) was sprinkled between interlayers of the fabric to give a stack 10 layers thick. The stack was compressed at 380° C. and 100 atmospheres pressure for 20 minutes. A product of void content of about 1% was produced. (A pressure of 50 atmospheres had been found to give unacceptable impregnation.)

Sample E was prepared from impregnated uniaxial composite as described for the control sample for Example 1 using a pressure of 10 atmospheres at 400° C. to produce a consolidated product with no detectable voids. Sample F records results for a 68% by volume fibre composite projected from the values of Sample E.

TABLE 4

| Sample | Fibre Content % by volume | Modulus (GN/m$^2$) | Flexure at 23° C. Strength (MN/m$^2$) | Short Beam Shear Strength (MN/m$^2$) | IFWIT (on 1 mm sheet) INIT | FAILURE |
|---|---|---|---|---|---|---|
| A | 54 | 56 | 630 | 62 | 1.3 | 3.6 |
| B | 54 | 58 | 730 | 75 | | |
| C | 57 | 51 | 703 | | | |
| D | 68 | 87 | 1083 | | 1.1 | 4.5 |
| E | 52 | 60 | 850 | 84 | 2.2 | 6.9 |
| F | (68) | 78 | 1110 | | | |

In the case of the impact testing on sample A the sample broke in several pieces. Samples D and E failed in a different manner, a hole being punched through the sample which remained otherwise intact, apart from some delamination around the hole.

EXAMPLE 4

Example 3 was repeated except that two of the tensioning rollers, prior to the impregnation bars, were omitted to minimise the tension in the fabric, other than that required to feed the fabric smoothly from the reel to the impregnation bars.

The product did not have distorted fibres and the prepreg width was reduced by only about 5% from that of the original fabric.

Using this process pre-impregnated woven fabrics were prepared based on Victrex PEEK resin having a melt viscosity at 1000 sec$^{-1}$ measured by capillary rheometry of 100 Ns/m$^2$, the composition used for blending being an equal mass of diphenyl sulphone and the resin. The fabrics used were five shaft satin weaves based on 3000 filament tows having an areal weight of carbon fibre of 260 gm/m$^2$ and were woven by Fothergill and Harvey Fabrics using their standard techniques. Two experiments were performed using fabrics woven from Hercules AS4 carbon fibre and Toho Besfight fibre grade ST respectively. The line speed in each case was 0.3 m/minute. The properties of products formed from these fabrics was compared with those of cross plied uniaxial products (prepared from Hercules AS4 fibre). As shown below properties were measured in both warp and weft direction for the fabrics; and axially, and transverse to the surface ply, for cross plied uniaxial product.

Flexural Testing

Three point flexural testing confirms that there is a balance between warp and weft direction.

| | FLEXURAL PROPERTIES AT 23° C. | | | | | |
|---|---|---|---|---|---|---|
| | WOVEN ex Mk VI [0/90]$_{2S}$ | | | | LAY UP [0,90]$_{2S}$ 60% by volume | |
| | 50% by volume Hercules AS4 | | 50% by volume Toho Besfight ST | | Hercules AS | Transverse |
| | Warp | Weft | Warp | Weft | Axial | |
| Modulus GN/m$^2$ | 65 (2) | 57 (1) | 64 (7) | 59 (1) | 87 (8) | 40 (1) |
| Strength | 1016 | 984 | 1034 | 1071 | 1219 | 595 |

-continued

FLEXURAL PROPERTIES AT 23° C.

| | WOVEN ex Mk VI [0/90]$_{2S}$ | | | | LAY UP [0,90]$_{2S}$ 60% by volume Hercules AS | |
|---|---|---|---|---|---|---|
| | 50% by volume Hercules AS4 | | 50% by volume Toho Besfight ST | | | |
| | Warp | Weft | Warp | Weft | Axial | Transverse |
| MN/m$^2$ | (45) | (51) | (102) | (34) | (143) | (2) |

(standard deviation in parentheses)

The magnitude of the anisotropy in the cross plied uniaxial [0,90]$_{2S}$ laminate properties demonstrates the dominance of surface ply. While this is to be expected from laminate analysis, the ease of obtaining a balanced sheet from wovens is a major advantage for such materials for thin skins.

Short Beam Shear and Water Resistance

Short beam shear strengths were measured dry and after immersion in boiling water for 24 hours.

SHORT BEAM SHEAR AT 23° C.

| | WOVEN ex Mk VI Ex Mk VI 50% by volume AS4 | | LAY UP APC-2 60% by volume AS4 | |
|---|---|---|---|---|
| | WARP | WEFT | AXIAL | TRANSVERSE |
| Strength, dry | 71 (2) | 74 (3) | 82 (3) | 69 (3) |
| Strength, wet | 68 (3) | 69 (5) | 81 (3) | 68 (6) |

(standard deviation in parentheses)

Impact Testing

Instrumented falling weight impact tests (IFWIT) indicate comparability in magnitude of strength with the biaxial laminate product.

IFWIT TESTING AT 23° C. ON 2 mm THICK 0/90 PLAQUES HERCULES AS4 FIBRE

| | WOVEN (50% by volume) [0/90]$_{4S}$ | | LAMINATE (60% by volume) [0,90]$_{4S}$ | |
|---|---|---|---|---|
| Initiation Energy J | 7.0 | (3.0) | 5.9 | (1.0) |
| Failure Energy J | 22.0 | (0.5) | 22.6 | (2.3) |

(standard deviation in parentheses)

EXAMPLE 5

The low pre-tensioning system of Example 4 was used but instead of using stationary impregnation bars these were replaced with rotating rollers, rotating them at the same circumferential velocity as the line speed. (0.3 m/minute). The product was similar to that of Example 4 but tension in the fabric was slightly reduced.

EXAMPLE 6

The procedure of Example 5 was followed using a fabric 450 mm wide. Enhanced control of the fabric feed was obtained by positioning two of the three preimpregnation rollers to form a pair of 'Z' wrap tensioning rollers. The impregnation bars were rotated at the line speed as in Example 5. These impregnation rollers were maintained at about 400° C. The polymer plasticiser mixture was changed to 25/75 PEEK/DPS.

The fabrics used in this example were rapier woven five shaft satin fabrics based on Toho Besfight ST 3000 filament tows. Two sources of fabric supply were used: Fothergill and Harvey and Carr Reinforcements. Both gave similar products.

In both cases the fabrics showed substantially no change in width before and after impregnation. The following mechanical property spectrum was obtained (compared with that of cross ply laid up APC-2 as described in Example 4).

Tensile Testing

| | Woven Fabric (50% by volume AS4) | | Laminated APC-2 (60% by volume AS4) (0,90)S |
|---|---|---|---|
| | Warp Direction Test | Weft Direction Test | |
| Modulus GN/m$^2$ | 68 (1) | — | 76* |
| Strength (MN/m$^2$) | 779 (44) | 759 (15) | 1317* |

*These data are estimated from laminate analysis.

It would appear that tensile strength is significantly lower for the woven product. This is almost certainly due to the stress concentrations at the weave cross over. This effect has been previously described for fabrics impregnated by epoxy resins by Curtis and Bishop. (TR 83010 "An Assessment of the Potential of Woven Carbon Fibre Reinforced Plastics for Aerospace" S M Bishop and P T Curtis, RAE Farnborough 1983).

Compression Testing

This was determined using the method described by the Illinois Institute of Technology Research Institute in a report by Hofer et al "Development of Engineering Data on Mechanical Properties of Advanced Composite Materials" USAF Technique Report AFML-TR-72-205 Part 1.

| | Woven Fabric (50% by volume AS4) | | Laminated APC-2 (60% by volume AS4) | |
|---|---|---|---|---|
| | Warp | Weft | Axial | Transverse to Surface Ply |
| Strength (GN/m$^2$). | 655 (14) | 689 (36) | 637 (47) | 717 (23) |

(standard deviation in parentheses)

The reproducibility and the high value of compression strength is particularly surprising considering the inevitable fibre buckling which occurs in woven fabrics. That buckling would normally be expected to reduce the compression performance of fabric. These high values are an indication of excellence of impregnation obtained. The degree of impregnation was examined by electron microscopy on sections of the composite in both the weft and warp directions. An excellent level of wetting was seen with substantially no voiding.

SHORT BEAM SHEAR STRENGTH

| | WOVEN Ex PUI 50% by volume | | 0,90 LAMINATE APC-2 60% by volume AS4 | |
|---|---|---|---|---|
| | WARP | WEFT | AXIAL | TRANSVERSE |
| Strength, dry (MN/m$^2$) | 82 (3) | 78 (2) | 82 (3) | 69 (3) |

| SHORT BEAM SHEAR STRENGTH -continued | | | |
|---|---|---|---|
| WOVEN Ex PUI 50% by volume | | 0,90 LAMINATE APC-2 60% by volume AS4 | |
| WARP | WEFT | AXIAL | TRANSVERSE |
| Strength, wet 82 (2) | 75 (4) | 81 (3) | 68 (6) |

(MN/m$^2$)
(standard deviation in parentheses)

| IMPACT TESTING SHORT BEAM SHEAR STRENGTH | | | |
|---|---|---|---|
| | WOVEN 50% by volume | 0,90 LAMINATE 60% by volume | |
| | [0/90]$_{4S}$ | [0,90]$_{4S}$ | APC-2 |
| Initiation Energy (J) | 6.1 (2.7) | 5.9 | (1.0) |
| Failure Energy (J) | 19.1 (0.5) | 22.6 | (2.3) |

(Standard deviation in parentheses)

COMPARATIVE EXAMPLE B

Comparison of the properties of the products obtained in the preceding Examples with published data on known composites shows the excellent degree of wetting of the individual filaments of the fabrics in the present compositions. The comparison with the theoretical modulus and strength of carbon fibre composites is based on values of 240 GN/m$^2$ and 3600 MN/m$^2$ for flexural modulus and flexural strength respectively for carbon fibre. The tensile strength of the polyetheretherketone used in the Examples is taken as 95 MN/m$^2$.

The tensile strength of the polyphenylene sulphide (film grade resin from Philips) noted in the comparison is reported to be 79 MN/m$^2$. The polyamide imide resin noted in the comparison ('Torlon' available from Amoco) is reported to have a tensile strength of 180 MN/m$^2$. Data from the preceding examples and comparative published data is collected in the table below.

| FLEXURAL PROPERTIES OF 0/90 LAY UP | | | | | | | | | | | | |
|---|---|---|---|---|---|---|---|---|---|---|---|---|
| These properties are the average of tests in warp and weft direction for fabrics with the surface ply along and transverse to the test direction for cross plied uniaxial product.) | | | | | | | | | | | | |
| Sample No | Vol Frac Fibr | Mod GN/m$^2$ | Str MN/m$^2$ | SBS MN/m$^2$ | IMP J | Comparison with Optimum | | | Comparison with best uniaxial lay up | | | |
| | | | | | | Mod | Str | SBS | Mod | Str | SBS | IMP |
| 1 | .60 | 63 | 905 | 75 | 22.6 | 0.88 | 0.84 | 0.79 | 1.0 | 1.1 | 1.0 | 1.0 |
| 2 | .50 | 55 | 865 | 84 | 17 | 0.92 | 0.96 | 0.88 | 0.9 | 1.0 | 1.1 | 0.8 |
| 3 | .50 | 61 | 1000 | 73 | 22.0 | 1.03 | 1.10 | 0.77 | 1.0 | 1.1 | 1.0 | 1.0 |
| 4 | .50 | | | 80 | 19.1 | | | 0.84 | | | 1.0 | 0.9 |
| 5 | .54 | 56 | 630 | 62 | 9.0* | 0.86 | 0.65 | 0.65 | 0.9 | 0.7 | 0.8 | 0.4 |
| 6 | .54 | 58 | 730 | 73 | 9.5* | 0.89 | 0.75 | 0.79 | 0.9 | 0.8 | 1.0 | 0.4 |
| 7 | .57 | 51 | 703 | | | 0.75 | 0.69 | | 0.8 | 0.8 | | |
| 8 | .62 | 62 | 690 | 28 | | 0.83 | 0.62 | 0.40 | | | | |
| 9 | .60 | 47 | 641 | 48 | | 0.65 | 0.59 | 0.61 | 0.8 | 0.9 | 1.7+ | |
| 10 | .60 | 59 | 1007 | 90 | | 0.82 | 0.93 | 0.50 | | | | |

Modulus (Mod), Strength (Str) and Short Beam Shear (SBS) are measured in flexure. Impact resistance (IMP) is the punch through energy on a 2 mm thick sheet on an instrumented falling weight impact machine.
+This unusual result appears to be associated with a very low value reported for cross ply structures rather than a high value for the woven composite.
*In examples 1, 2, 3 and 4 the impactor punched through the sheet leaving a hole whereas in 5 and 6 the sheet fractured into four quarters.
Number 1 Based on a cross ply lay up of uniaxial prepregs using the standard commercial product from ICI PLC, APC-2, which represents the standard for comparison of examples 2–6.
Number 2 The product of Example 3.
Number 3 The product of Example 4.
Number 4 The product of Example 6.
Number 5 Sample A of Comparative Example A.
Number 6 Sample B of Comparative Example A.
Number 7 Sample C of Comparative Example A.
Number 8 Polyphenylene sulphide composite optimum uniaxial structure laid up crossply (Phillips data sheet).
Number 9 Polyphenylene sulphide composite based on impregnated fabric (Phillips data sheet).
Number 10 Polyamide imide composite based on impregnated fabric (Amoco data sheet).

We claim:

1. A fibre reinforced, thermoformable, plastics composite containing at least 30% by volume of reinforcing fibres comprising reinforcement in the form of a fabric woven from reinforcing fibres characterised in that the short beam shear strength of the composite as determined by ASTM Standard D-2344 using a sample span:-thickness ratio of 5:1, is at least 0.7 times the tensile strength or yield strength of the plastics material forming the matrix of the composite.

2. A fibre reinforced thermoformable plastics composite according to claim 1 wherein the flexural modulus and flexural strength values of the composite are at least 0.8 times the theoretical reinforcement values.

3. A fibre reinforced thermoformable plastics composite according to claim 1 wherein the flexural modulus, flexural strength, short beam shear strength and impact strength values are at least 0.8 times the values for a comparable composite of the same composition except in that the reinforcement comprises a cross ply lay up of prepregs containing continuous collimated fibres.

4. A fibre reinforced thermoformable plastics composite according to claim 1 or 2 wherein the form of continuous product is at least 10 meters in length.

* * * * *